April 7, 1931. J. B. ARMITAGE 1,799,272
MACHINE TOOL TRANSMISSION AND CONTROL
Filed Sept. 28, 1927 2 Sheets-Sheet 1
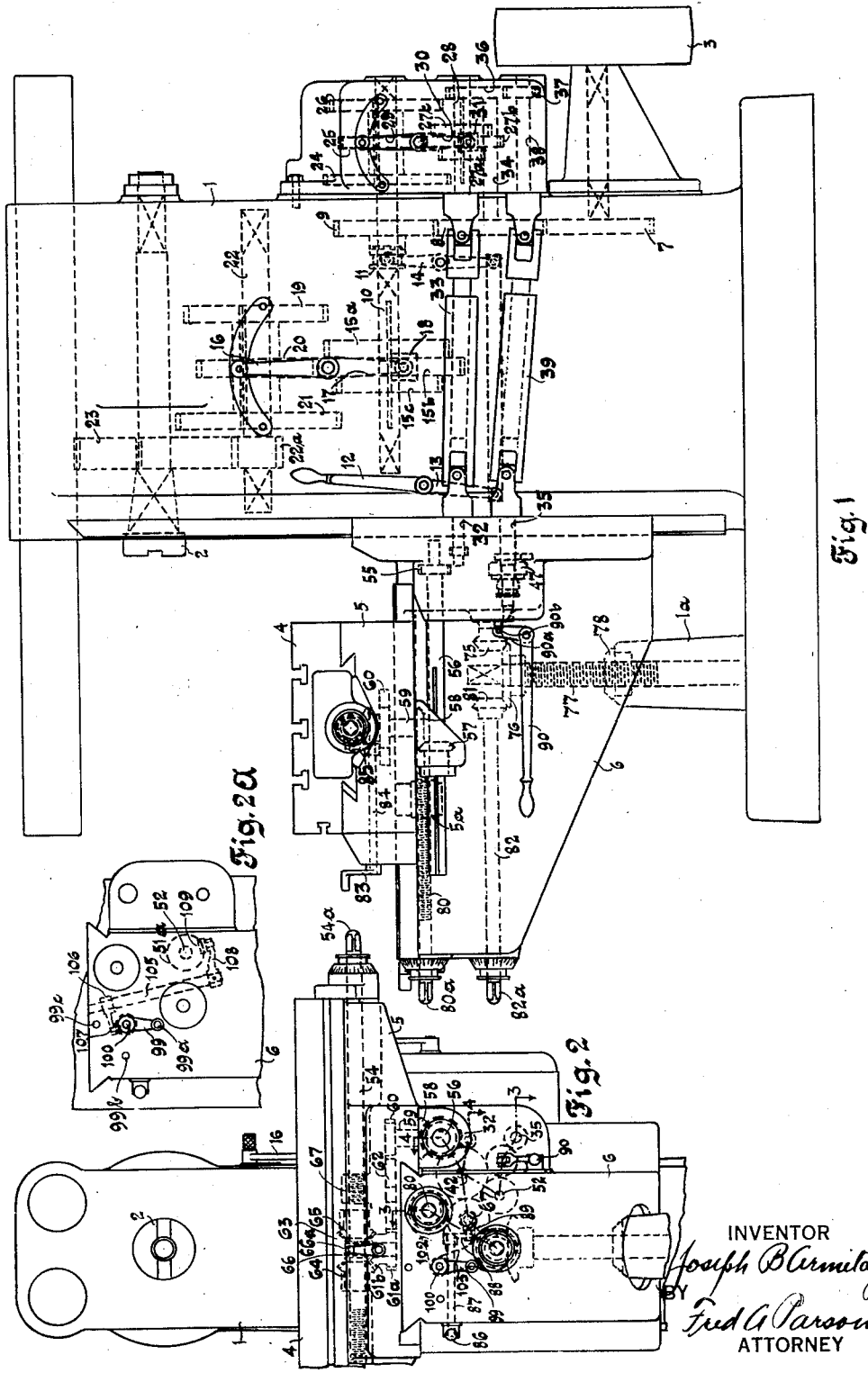

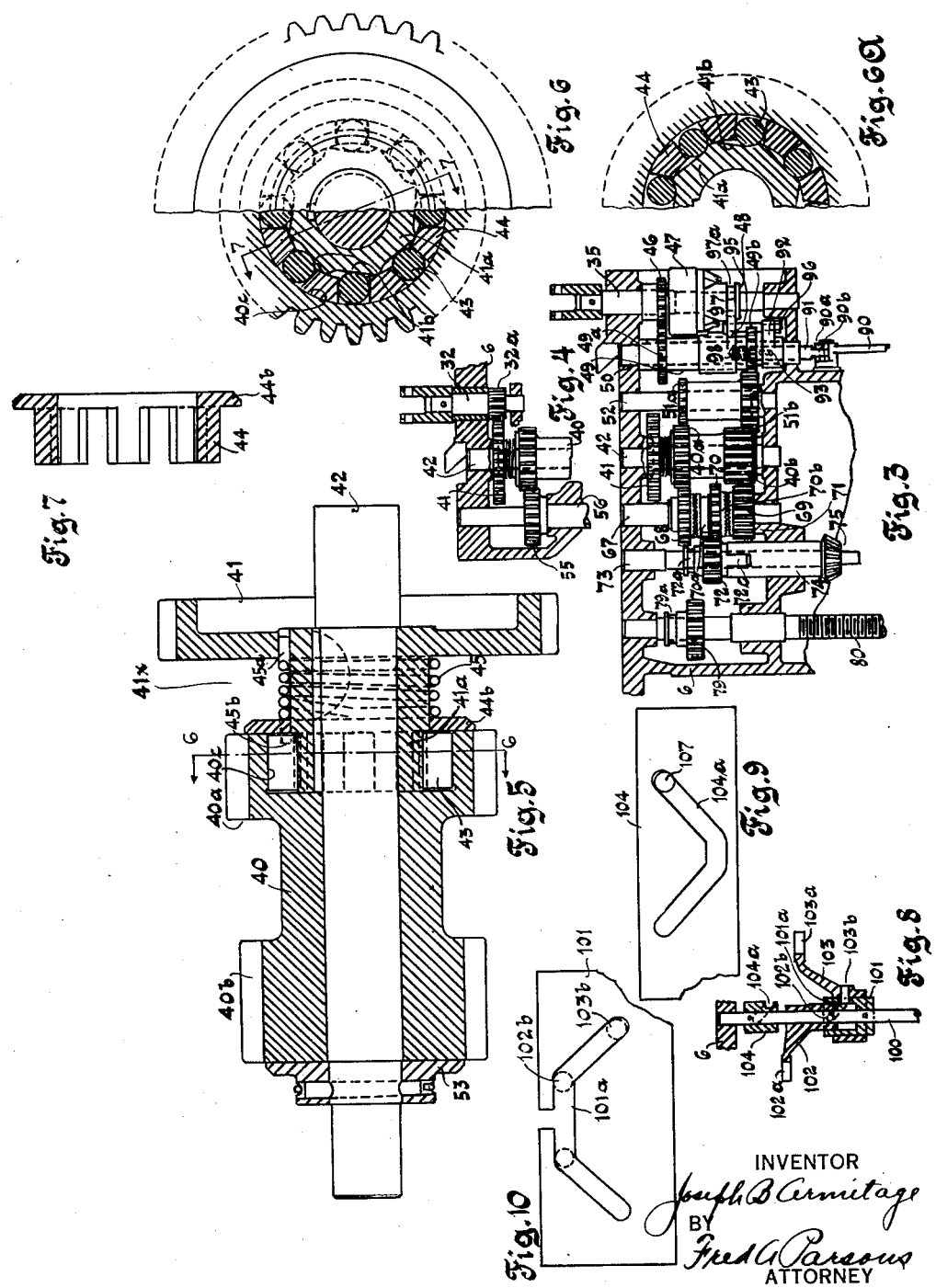

Patented Apr. 7, 1931

1,799,272

UNITED STATES PATENT OFFICE

JOSEPH B. ARMITAGE, OF MILWAUKEE, WISCONSIN, ASSIGNOR TO KEARNEY & TRECKER CORPORATION, OF WEST ALLIS, WISCONSIN

MACHINE-TOOL TRANSMISSION AND CONTROL

Application filed September 28, 1927. Serial No. 222,513.

This invention relates to transmission and control mechanism for power relative movement of the work and tool in a machine tool.

An object of the invention is to provide an improved machine tool transmission mechanism and an improved control therefor, whereby several supports may be selectively moved at preferred feed and rapid traverse rates.

Another object relates to transmission and control means for milling machines having several movable supports, whereby the support normally most used is provided with individual control means for maximum convenience of operation, while a plurality of other supports, normally less used, are provided with combination control means of suitable convenience of operation but greater simplicity of construction.

Another object is to provide a plurality of rapid traverse rates for a machine tool and controlled in accordance with the choice of which of a plurality of supports is to be moved.

Another object is to provide improved transmission means for alternatively applying a feed and a rapid traverse to drive a machine tool support with a minimum shock or strain when changing from the one to the other rate.

Another object is to provide mechanism whereby suitable brake means may be applied at the instant of changing from a fast support movement to a slow support movement.

Other objects relate to the simplification and improvement of the construction and operation of milling machines, others to a milling machine in which mechanism for one or more of the several purposes herein mentioned is provided in improved combination with other mechanism, and others to the combination of mechanism previously mentioned with certain milling machine structure to provide improved convenience or utility for the combination.

With the above and other objects in view, the invention consists of the novel features of construction, arrangement and combination of parts as herein shown and described and as particularly pointed out in the claims, and in such modifications as may be equivalent to the structure claimed.

In the drawings, the same reference characters have been used to designate the same parts in each of the views.

Fig. 1 is a right side elevation of a knee and column type of milling machine in which the invention is incorporated.

Fig. 2 is a front elevation of the same machine with portions broken away.

Fig. 2A is a partial front elevation showing the form and position of certain mechanism which could not be clearly shown in Fig. 2.

Fig. 3 is a developed partial section taken along line 3—3 of Fig. 2.

Fig. 4 is a developed partial section along line 4—4 of Fig. 2.

Fig. 5 is an enlarged section along one of the shafts shown in Fig. 3 and members associated therewith.

Fig. 6 is an end view of the mechanism shown in Fig. 5 partly in section along line 6—6 of Fig. 5.

Fig. 6A shows part of the mechanism of Fig. 6 in a different operating position.

Fig. 7 is a detail part in section.

Fig. 8 shows parts associated with a control shaft as will be described.

Figs. 9 and 10 are enlarged developments showing the form of certain cams shown in Fig. 8.

A column 1 rotatably supports a tool spindle 2 and a main drive pulley 3 forming a power source for the various transmissions of the milling machine. Column 1 also supports a table or work support 4 which is movable relative to tool spindle 2 in three transverse paths by the means of a saddle or support 5, which supports and guides the table for longitudinal horizontal movement, and a knee 6 which supports and guides the saddle for cross horizontal movement, and is itself supported and guided by the column for vertical movement. Pulley 3 drives through gears 7 and 8 to a gear 9 loose on shaft 10. A clutch generally denoted by the numeral 11 may be engaged or disengaged by means including a pivoted hand lever 12, operating through pivoted and connected levers 13 and 14 to slide a shiftable clutch member 11 in and out of engagement. Different sized gears 15a, 15b, 15c, are slidably keyed to shaft 10, to be shifted by means including a pivoted hand lever 16 connected with a lever 17 having a pivoted shoe or fork 18 engaging the sides of gear 15b. They may thus be selectively engaged with gears 19, 20, 21, fixed on shaft 22. The shaft 22 is connected to drive the spindle 2 by the means of gear 23 fixed on the spindle and pinion 22a fixed on the shaft. The mechanism just described constitutes a spindle drive train including a clutch and a rate changer by the means of which the spindle may be driven from pulley 3 at selected speeds or may remain idle.

The shaft 10 is extended and has fixed thereon the gears 24, 25, 26, adapted for selective engagement by gears 27a, 27b, 27c, which are slidably keyed to a shaft 28, and may be moved for such engagement by means including pivoted lever 29 connected with lever 30 which has a shoe or fork 31 engaging the sides of gear 27b. Shaft 28 drives a shaft 32, Figs. 1, 2, and 4, which is rotatably supported by the knee 6, through an extensible universal joint shaft generally denoted by the numeral 33 and of usual construction.

The mechanism described constitutes a feed train including a rate changer, whereby shaft 28 may be driven from pulley 3 at a selected feed rate, but only when the spindle 2 is driven, since power is derived through the clutch 11.

Gear 8 is fixed on a shaft 34, Fig. 1, and drives a shaft 35, Figs. 1, 2, 3, rotatably supported in knee 6, through gears 36 and 37, shaft 38, and a collapsible universal joint of usual construction and generally denoted by the numeral 39. Such mechanism constitutes a constant speed rapid traverse train, whereby shaft 35 may be driven whenever pulley 3 is rotated.

The feed shaft 32 may drive a sleeve 40 through mechanism as follows. A pinion 32a fixed on shaft 32 drives a gear 41 fixed on shaft 42. See Figs. 2, 3, 4, 5; of which Fig. 2 particularly shows the relative position of the shafts. The sleeve 40 is free to rotate on but is supported by shaft 42 and is driven from gear 41 for reasons which will appear later through an over-running clutch device generally denoted by the numeral 41x of Fig. 5 whereby gear 41 may drive the sleeve, but power may not be transmitted in the other direction. The device 41x consists of a cam member or driver 41a, Figs. 5, 6, 6A, fixed or integral with the extended gear hub, and having a series of cam faces 41b spaced around the periphery and forming, with an interior bore or recess 40c of sleeve 40, a series of spaces or pockets each adapted to contain roll members 43. The roll members 43 are spaced and retained for simultaneous movement by the means of a cage member 44 which it is supported. A torsion spring 45 has one end 45a fixed in a suitable recess in gear 41 and the other end 45b in a similar recess in cage 44, the arrangement being such that the spring tends to rotate the cage relative to cam member 41a in a direction to yieldingly force the rolls along the cam faces 41b, which have a rise sufficient to cause the rolls to move outwardly into contact with the interior of the bore 40c. Each roll then acts as a friction member tending to drive the sleeve 40 from feed shaft 32 unless the sleeve is rotated more rapidly in the same direction, in which case the rolls release their grip and sleeve 40 is free to turn independently.

Sleeve 40 may also be driven from quick traverse shaft 35 through the following mechanism. Rotatable on shaft 35 is a gear 46, Fig. 3, which may be clutched with the shaft to be driven therefrom by the means of a friction clutch generally denoted by the numeral 47, and having a shiftable spool or clutch engaging member 48. Clutch 47 may be of any well known type and therefore is not shown or described in detail. Gear 46 meshes with a gear 49a fixed on a sleeve 49 rotatable on a fixed stud 50. A gear 49b is also fixed on the sleeve 49 to rotate with gear 49a, the gears 49b and 49a being of different diameter. Complementary gears 51a and 51b rotatably supported on a fixed stud 52 may move axially to engage one at a time with the gears 49a and 49b respectively and accordingly as the one or the other is engaged the gear 51b will, if clutch 47 is engaged, be driven at either of two quick traverse rates. Gear 51b in any position of its axial movement, meshes with a gear 40b fixed on sleeve 40.

The two quick traverse rates alternatively obtained through gears 49a and 49b each tend to revolve sleeve 40 in the same direction as the feed drive but at a rate more rapid than the highest feed rate. Thus, when clutch 47 is engaged, the rolls 43 of the over-running clutch device 41x disengage as previously explained and permit the sleeve 40 to move at a quick traverse rate, but immediately the clutch 47 is disengaged the speed of the sleeve is reduced and the device 41x again drives the sleeve at the feed rate.

When the rapid traverse and feed rates are alternated, the mechanisms usually employed subject the parts to great strain and shock, both when the driven parts are suddenly accelerated and when their rate is suddenly reduced to a feed rate. By the improved mechanism here shown such shock is almost completely avoided in each instance. The rapid traverse rate is comparatively very gradually applied to the heavy supports, in part because of the well known nature of friction clutches and in part because the povantage to be taken of the torsional resiliency of the driving and driven shafts.

When the clutch is disengaged to engage the feed the rolls 43 will not act to retard the sleeve 40 or the parts driven therefrom until the rate has been reduced by friction to a feed rate. To reduce the time interval before this occurs and thereby increase production from the machine, a friction brake is employed, which takes effect the instant the clutch 47 is disengaged, by the means of the following construction. The cage member 44 is provided with an enlarged flange portion 44b, and a friction flange 53 is fixed on shaft 42. The sleeve 40 is retained between friction faces of the flange portion 44b and flange 53, and spring 45 although primarily for another purpose as described, sets up a considerable endwise pressure between the opposed and inter-acting surfaces. Shaft 42 together with cage 44 and flange 53 are continuously driven at a feed rate, whereby there is no retarding friction from the pressure of spring 45 during feed movement of the supports, but when sleeve 40 is driven at a rapid traverse rate the parts described act as a brake which tends to slow the sleeve down to a feed rate immediately clutch 47 disengages. Additional braking effect is had from the friction of the rolls 43 against the interior of bore 40c, the sides of the slots in cage 44 and the cam surfaces 41b. The rolls cannot drive sleeve 40 during quick traverse movement but a continuous friction is maintained between the surfaces mentioned during such movement because the tendency of spring 45 is to force the rolls into the wedge-shaped space between the cam surface and the bore and immediately the clutch 47 is disengaged such friction is added to the friction mentioned above as an added brake retarding the parts to a feed rate, but inoperative during feed movement.

Sleeve 40 may drive a table screw 54 through a train which is individual to the table consisting of a gear 55, Figs. 4 and 1, shaft 56, a bevel gear 57 slidably splined on shaft 56 and movable with saddle 5, bevel gear 58 meshing therewith, shaft 59, gear 60 fixed thereon and driving gear 61a, Fig. 2, through an idler 62 and a reverser generally denoted by the numeral 63 including bevel gear 61b fixed with gear 61a and the oppositely disposed bevel gears 64 and 65 meshing therewith. The screw 54 is journaled at its ends in table 4 but fixed against axial movement relative thereto in the usual manner and passes through suitable axial bores in gears 64, 65. Positioned between the gears is a clutch or reverser member 66 slidably keyed to the screw 54 and adapted to be oppositely shifted to clutch engagement with suitable clutch devices on the respective gears or to be centrally positioned, out of engagement with either gear, whereby member 66 and screw 54 may be driven in either direction or may be stopped. Screw 54 is in threaded engagement with a nut 67 fixed in saddle 5 and when rotated will cause table 4 to move in the one or the other direction according to the direction of screw rotation.

The mechanism just described constitutes a table train operable from sleeve 40 independently of any other mechanism driven from the sleeve, and including means for independently reversing or stopping the table.

Sleeve 40 may drive the saddle 5 or knee 6 through mechanism as follows. A stud 67, Fig. 3 carries a clutch gear 68 meshed directly with gear 40a, and a clutch gear 69 driven from gear 40b through the gear 51b, which acts as an idler. Fig. 3 being a development does not show the gears in mesh, but the relationship described may be clearly seen in Fig. 2 which shows the studs 67, 42, 52 in their true position. Thus gears 68 and 69 are oppositely driven. A clutch member 70b positioned between the gears may be shifted in the one or the other direction to engage suitable clutch faces thereon with complementary clutch faces of the one or the other gear, whereby the member 70b may be driven in either direction, and may also be centrally positioned to remain stationary. The mechanism just described constitutes a reverser and motion interrupter generally denoted by the numeral 71 whereby parts driven from clutch member 70b may be driven in either direction or may be stopped. Fixed on clutch member 70b is a gear 70.

A knee transmission may be driven from gear 70 consisting of a gear 72 rotatable and axially movable on a stud 73, and having projecting lugs or keys 72c engaging with complementary slots in the extended hub 74 of a bevel gear 75, which meshes with a bevel gear 76, Fig. 1, fixed on a vertical screw 77 having threaded engagement with a nut 78 fixed in an upstanding stump portion 1a of the base of column 1. Gear 72 may be moved to engage or disengage gear 70 and if engaged the knee may be driven in either direction or stopped by the reverser 71.

A saddle transmission may be driven from gear 70, as follows. A gear 79, Fig. 3, is slidably keyed on the shank of a screw 80, Figs. 1, 2 and 3. Gear 79 when in one position of axial movement engages with gear 70. This may be easily seen from the relative position of screw 80 and stud 67 in Fig. 2, although Fig. 3, being a development does not show the gears meshed. Screw 80 is in threaded engagement with a nut 5a fixed with saddle 5, Fig. 1. Gear 79 may be moved to engage or disengage gear 70, and if engaged the saddle may be driven in either direction or stopped by the reverser 71.

The transmission described consists of a portion common to both the saddle and knee and including reverser 71, and other portions individual to the knee and saddle respectively whereby either the knee or saddle may be driven in either direction from the sleeve 40.

The several screws may each be hand operated for manual movement of the supports, the saddle screw 80 and the table screw 54 being provided with squared ends 80a and 54a respectively, and the vertical screw 77 having a gear 81 engaging gear 76 and fixed on a shaft 82 having a squared end 82a, the several squared ends being adapted for a crank, not shown.

The table reverser 63 may be manually operated by the means of a hand lever 83, Fig. 1, fixed on a shaft 84 upon which is also fixed a lever 85 having a pivoted shoe engaging a suitable annular groove 66a in the shiftable reverser member 66.

The saddle and knee reverser 71 may be manually operated by the means of a hand lever 86, Fig. 2 fixed on a shaft 87 upon which is also fixed a lever 88 having a pivoted shoe 89 engaging with a suitable annular groove 70a, Fig. 3 in the shiftable reverser member 70b.

The friction quick traverse clutch 47 may be manually operated as follows. A pivoted hand lever 90, Figs. 1, 2, 3, moves a short rod 91 through a lever portion 90a and a pin 90b engaging a suitable slot in the rod. Rod 91, is slidably supported in a suitable axial bore in the stud 50, upon which is slidably supported a sleeve 92 connected for movement with rod 91 by the means of a pin 93 passing through the sleeve and rod 91, there being a suitable slot in the stud 50 to provide for the pin movement. Sleeve 92 is connected for movement with a fork 95 by the means of a stud or rod 96 fixed in both members. The fork 95 has a sleeve slidably supported on the sleeve which forms the hub connecting the gears 49a and 49b, and engages with an annular groove 97a in the shiftable clutch member 97. The unbalanced weight of lever 90 tends to move the clutch member 97 out of engagement but is sufficiently overcome to prevent undesired disengagement by the means of a spring 98 in the same bore which guides rod 91.

The gears 79 and 72 may be shifted to determine whether the saddle or knee is to be power driven, by the means of the following mechanism.

A hand lever 99 is fixed on a shaft 100 which carries a cam member 101, Figs. 2, 2a, 8 and 10. Suitably positioned relative to the same member are the forks 102 and 103. Fork 102 is slidable on shaft 100 and has a portion 102a engaging an annular groove 79a, Fig. 3, in the hub of gear 79. A cam follower pin 102b fixed in the sleeve of the fork operatively engages the cam groove 101a in the cam member. Fork 103 is slidable on the outside of the cam member and has a portion 103a engaging an annular groove 72a, Fig. 3, in the hub of gear 72. A cam follower pin 103b fixed in the sleeve of the fork also operatively engages the cam groove 101a. As shaft 100 is turned by the hand lever 99, the cam pins follow the cam groove to shift the gears in and out of engagement with the driving gear 70. The cam groove is so shaped that rotation in the one direction shifts the one gear in and the other out, and opposite rotation has opposite effect, as may be seen from the diagram of the cam groove, Fig. 10. There is a central position in which both gears are disengaged and neither the knee or saddle receives power. Thus the control mechanism has positions effective for actuating either the knee or saddle but not both, and a central position in which neither are actuated. Such positions are defined by the means of a spring plunger 99a associated with hand lever 99 and adapted to engage suitable configuration when the lever is positioned as described two of such configurations being shown at 99b and 99c, Fig. 2A, the other being hidden by the lever.

The described movement of lever 99 also simultaneously controls the shifting of the gears 51a 51b for selecting one or the other of the rapid traverse rates to be effective when clutch 47 is engaged as follows. Shaft 100 has fixed thereon a cam member 104, Figs. 2A, 8, 9. An adjacent shaft 105 has fixed thereon a lever 106 provided with a cam or follower pin 107 engaging the cam groove 104a of the cam member, and also fixed on shaft 105 is a lever 108 having a pivoted fork 109 engaging the sides of gear 51a. The form of cam groove 104a and relationship of the parts is such that when lever 99 is positioned centrally so that neither the knee or saddle may be actuated, the gear 51a is engaged with gear 49a whereby the faster of the two rapid traverse rates is available to drive the table, but if the lever 99 is in either of its other positions whereby the knee or saddle may be actuated, then the gear 51b is engaged to be driven from gear 49b and the slower of the two rapid traverse rates is available to drive either the knee, saddle or table according to the shifting of the other control mechanism. Thus the table may be driven at either rapid traverse rate but the knee and saddle may only be driven at the slower rapid traverse rate.

What is claimed is:

1. In a milling machine having a vertically movable knee, a saddle movably supported on said knee and a table movably supported on said saddle, the combination of transmission mechanism for movement of said knee, saddle and table including a member shiftable to select different rates, said mechanism also including means shiftable to different positions for movement of said knee and saddle respectively and to another position in which said transmission is inoperative for knee or saddle movement, and control mechanism including a connection between said member and said means and operative to prevent movement of said knee at the faster one of said rates.

2. In a milling machine, the combination of a rotatable tool spindle, a plurality of supports each movable relative to said spindle, transmission mechanism for movement of said supports including shiftable elements selective of a support to be actuated, a feed train normally connectible to drive said shiftable elements and including an overrunning device, a quick traverse train including mechanism shiftable for transmitting different quick traverse rates, mechanism selectively operable to connect or to disconnect said quick traverse train and said device, and control means for said transmission mechanism including means preventing said quick traverse train from actuating said device at one of said quick traverse rates when said shiftable elements are in a predetermined position.

3. In a milling machine having a rotatable tool spindle, a knee member, a saddle member and a table member each bodily movable relative to said spindle, a spindle drive including a power member and a clutch, transmission mechanism for movement of said members including elements relatively shiftable to select different of said members to be actuated from said transmission, said elements having a position selective of said knee and another position selective of said saddle and a third position in which only said table may be actuated, a feed train driven from said power member through said clutch and including a feed rate changer, a quick traverse train driven from said power member exclusive of said clutch and of said feed rate changer, said trains being alternatively connectible for actuating said elements, said quick traverse train providing mechanism shiftable for different quick traverse rates, and control means operable on the last mentioned mechanism in accordance with the position of said elements to prevent actuation of any of said elements at one of said quick traverse rates except when said elements are in said third position.

4. In a machine tool having a movable support, the combination of transmission mechanism for said support including a feed train, a rapid traverse train, and overrunning clutch means for alternatively connecting the one or the other of said trains to actuate said support including a plurality of adjacent elements, one of which is connected to be driven from said feed train and the other connectible to be driven from said rapid traverse train, one of said elements providing a cam surface, and means for driving one of said elements from the other including a friction member associated with said cam surfaces and means yieldably pressing said friction member to move along said cam surface, said friction member being adapted for such movement thereof to cause simultaneous engagement of the friction member with each of said adjacent elements, said rapid traverse train providing motion interrupting means whereby to prevent either of said elements being driven at a rapid traverse rate during said simultaneous engagement.

5. In a milling machine, the combination of a rotatable tool spindle, a column supporting said spindle, a support member movably supported from said column, a table member supported on said support for horizontal movement in a path transverse to the axis of said spindle, a spindle transmission including a motion interrupting clutch and a speed rate changer, and transmission mechanism for actuating said members including a feed train providing a feed rate changer and driven through said clutch to exclude said speed rate changer, a quick traverse train unaffected by said clutch and by either of said rate changers and adapted to be operated at two different quick traverse rates, a transmission element, mechanism normally connecting said feed train to actuate said element and including an overrunning device, means for selectively connecting or disconnecting said quick traverse train and said device, branch lines connectible with different of said members respectively and each connected to be actuated from said element, and control mechanism including control means selective of the one or the other of said branch lines to actuate the member with which it is connectible, and control means operable to prevent operation of said element at one of said quick traverse rates when the first mentioned control means is positioned to select said support member for actuation.

6. In a milling machine, the combination of a rotatable spindle, a work table associated with said spindle and bodily movable relative thereto in three mutually transverse paths, transmission mechanism for movement of said table including a feed train providing a feed rate changer, a quick traverse train driven to exclude said feed rate changer and adapted to be operated at two different quick traverse rates, a transmission element, mechanism normally connecting said feed train to actuate said element and including an overrunning device, means for selectively connecting or disconnecting said quick traverse train and said device, a first branch line for connecting said element for movement of said table in a first one of said paths and including a first reverser, a second reverser operable from said element independently of said first reverser, a second branch line for connecting said second reverser for movement of said table in a second one of said paths, a third branch line for connecting said second reverser for movement of said table in a third one of said paths, and control mechanism including means determinative of which of said branch lines is to actuate said table, and means preventing actuation of said element at one of said quick traverse rates during movement of said table either from said second or from said third branch line.

7. In a milling machine, the combination of a base, a rotatable tool spindle and a work support each supported from said base and relatively bodily movable in a plurality of paths, a power member, a spindle driving train including said member, a rate changer and said spindle in the order mentioned, a transmission for said relative movement including a feed rate element and a quick traverse rate element each driven from said spindle train to exclude said rate changer, a feed train driven from said feed rate element and including an overrunning device, a plurality of branch lines respectively for said relative movement in different of said paths and each including a reverser, each of said branch lines being normally connected with said feed train through said overrunning device, and control mechanism for said transmission including means adapted to selectively connect said quick traverse rate element with said device or to disconnect it therefrom, and means for selective individual operation of said reversers.

8. In a milling machine, the combination of a rotatable tool spindle, a work table, said spindle and table being relatively bodily movable in a plurality of paths, a spindle drive including a power source, and a rate changer, and transmission and control mechanism for said bodily movement including a feed train driven from said power source and a quick traverse train driven from said power source to exclude said rate changer, branch lines respectively for said bodily movement in respective of said paths, overrunning mechanism normally connecting said feed train to actuate a portion of both of said branch lines, means for operating each of said branch lines from said quick traverse train, and a reverser in one of said branch lines individually controlling direction of movement actuated from the last mentioned branch line, said transmission and control mechanism including means operative to effect a different rate of quick traverse movement in the different paths.

9. In a machine tool the combination of a plurality of movable supports, and transmission and control mechanism for movement of said supports including a power source, a feed train driven from said source and including a rate changer, a quick traverse train driven from said source to exclude said rate changer, a plurality of branch lines respectively for movement of the respective supports, overrunning mechanism normally connecting said feed train to drive a portion of both of said branch lines, a plurality of reversers respectively in the respective branch lines, selective means for alternative actuation of each of said branch lines from said quick traverse train, and manually operable devices for the individual operation of each of said reversers and of said selective means.

10. A milling machine including a column, a tool spindle rotatably supported from said column, a knee supported from said column for bodily vertical movement, a work table slidably supported on said knee for movement in a plurality of paths transverse to one another, and transmission mechanism for the movement of said table including a power member rotatably supported on said column, a feed train driven from said member and including a feed element bodily movable with said knee, a quick traverse train driven from said member and including a quick traverse element bodily movable with said knee, a table transmission, overrunning mechanism normally connecting said feed element to actuate said table transmission and bodily movable with said knee, mechanism bodily movable with said knee and selectively operable to connect and disconnect said quick traverse element to operate said table transmission, said table transmission including branch lines respectively operative for table movement in respective of said paths, one of said branch lines including a reverser bodily movable with said knee and individual to the table movement in the path operative from the last mentioned branch line.

11. In a milling machine, the combination of a rotatable tool spindle, a base supporting said spindle, a work table supported from said base, said spindle and table being relatively bodily movable in a plurality of paths, a spindle train including a power source and a rate changer, transmission mechanism for said bodily movement and driven from said power source to exclude said rate changer and including a feed rate train, a quick traverse rate train, a plurality of branch lines respectively for movement in the respective paths, overrunning mechanism normally connecting said feed train for uni-directional actuation of a portion of both of said branch lines, a plurality of reversers individual to the respective branch lines and adapted to selectively provide either direction of movement in either of said paths in spite of the uni-directional actuation of said branch line portions, means shiftable for connection of said branch lines to be actuated from said quick traverse train, and control mechanism for said transmission including means for individually selectively operating said reversers, and other means for individually operating said quick traverse connecting means, said transmission and control mechanism being adapted to effect said quick traverse at substantially different rates in the respective paths.

In witness whereof I hereto affix my signature.

JOSEPH B. ARMITAGE.